(12) United States Patent
Korzeniowski

(10) Patent No.: US 8,518,249 B2
(45) Date of Patent: Aug. 27, 2013

(54) VERSATILE BIOLOGICAL WASTEWATER TREATMENT SYSTEM

(76) Inventor: Jan A. Korzeniowski, Calgary (CA)

( * ) Notice: Subject to any disclaimer, the term of this patent is extended or adjusted under 35 U.S.C. 154(b) by 339 days.

(21) Appl. No.: 12/463,110

(22) Filed: May 8, 2009

(65) Prior Publication Data

US 2010/0282653 A1 Nov. 11, 2010

(51) Int. Cl.
*C02F 3/00* (2006.01)
(52) U.S. Cl.
USPC ........ 210/150; 210/151; 210/220; 210/195.2; 210/196; 210/197
(58) Field of Classification Search
USPC ................. 210/605, 620–624, 150–151, 220, 210/195.2, 196, 197
See application file for complete search history.

(56) References Cited

U.S. PATENT DOCUMENTS

| | | | | | |
|---|---|---|---|---|---|
| 4,867,883 | A | * | 9/1989 | Daigger et al. | 210/605 |
| 4,915,840 | A | * | 4/1990 | Rozich | 210/605 |
| 6,039,873 | A | * | 3/2000 | Stahler | 210/605 |
| 2007/0000836 | A1 | * | 1/2007 | Elefritz et al. | 210/625 |

* cited by examiner

*Primary Examiner* — Chester Barry

(57) ABSTRACT

A biological wastewater treatment system is provided which is adaptable to small, shop fabricated package plants and large, assembled in place plants, and which can be operated as a secondary treatment, activated sludge process, for suspended solids and BOD removal, or a tertiary treatment, activated sludge process, for suspended solids, BOD, nitrogen and phosphorus removal. The system includes a wastewater pump and an air aspirator-mixer to provide aeration, sludge recirculation and waste, and wastewater recirculation for the secondary and tertiary treatment processes. The aeration system with the air aspirator-mixer transfers oxygen to the wastewater, and is located outside aeration tanks. The wastewater pump and air aspirator-mixer system lends itself to continuous and cyclic aeration and oxic and anoxic treatment processes. The multiple use of the wastewater pump for aeration, recirculation and sludge waste minimizes the number of pumping systems required and eliminates air blowers.

17 Claims, 2 Drawing Sheets

VERSATILE BIOLOGICAL WASTEWATER TREATMENT SYSTEM

CROSS-REFERENCE TO RELATED APPLICATIONS

| | | |
|---|---|---|
| 4,243,521 | January 1981 | Tharp et al |
| 4,301,007 | November 1981 | Savard et al |
| 5,316,668 | May 1994 | Tang |
| 5,643,453 | July 1997 | Pannier et al |
| 6,676,836 B2 | January 2004 | Mandt |
| 4,246,111 | January 1981 | Savard et al |
| 4,192,740 | March 1980 | Savard et al |

FIELD OF THE INVENTION

The invention relates to a process and apparatus for biological wastewater treatment as a secondary or a tertiary treatment process.

BACKGROUND OF THE INVENTION

Biological, activated sludge wastewater treatment process usually operates as a secondary treatment system or a tertiary treatment system for removal of suspended solids, BOD, nitrogen and/or phosphorus.

The treatment systems involve wastewater aeration, sludge recirculation and disposal waste) and aerated wastewater recirculation. The aeration system can be continuous or cyclic. The aeration system usually requires air blowers and air diffusers located in aeration tanks or proprietary air aspirators with a pump which pumps wastewater and air in an aeration chamber.

Simple one-pump aeration system usually operates as a secondary treatment process with a sludge recirculation or extended aeration secondary treatment process without a sludge recirculation. These processes do not provide a tertiary treatment and the secondary treatment which they provide is not well controlled and efficient. These systems usually require large tanks to provide adequate secondary treatment due to a lack of an adequate treatment process and controls in regard to sludge recirculation and disposal of excess sludge, and aeration and mixing in the aeration chamber, and recirculation of aerated wastewater.

Also, the aeration systems used are not efficient in regard to the oxygen transfer to the wastewater.

This invention is based on wastewater aeration by means of a pump and an air aspirator-mixer. The pump also recirculates and wastes the activated sludge produced by the biological treatment process, to maintain an activated sludge treatment process and recirculates the aerated wastewater to accomplish a tertiary treatment process. The air aspirator-mixer supplies air and causes an oxygen transfer to the wastewater by a turbulent hydraulic mixing of wastewater and air.

The objectives of this invention include the following:
- to provide wastewater aeration, activated sludge recirculation and waste, and wastewater recirculation by means of the same pump,
- to supply air to the wastewater and to the activated sludge and to mix the air and the wastewater and the activated sludge, and to accomplish oxygen transfer to the wastewater and to the activated sludge by an air aspirator-mixer.
- to provide a tertiary biological wastewater treatment process for removal of suspended solids, BOD, nitrogen and phosphorus and which can also be used as a secondary biological wastewater treatment process for removal of suspended solids and BOD,
- to provide flexibility and control of the time and rates of the wastewater and sludge aeration, sludge recirculation and waste, and the aerated wastewater recirculation, to accomplish a secondary or a tertiary wastewater treatment,
- to provide wastewater treatment system which can be used for small, shop fabricated treatment plants for installation above or under ground, and large, site assembled treatment plants,
- to provide wastewater treatment system which is compact and has a small foot print, and
- to provide a system of low operation and maintenance requirements.

BRIEF SUMMARY OF THE INVENTION

The treatment system of the present invention is a process and apparatus for biological, activated sludge treatment of municipal and industrial wastewaters.

The treatment system provides a tertiary treatment for removal of suspended solids, BOD, nitrogen and phosphorus. Also, the treatment system can operate as a secondary treatment for removal only of suspended solids and BOD.

The treatment system comprises primary suspended solids and excess (waste) activated sludge retention chamber, anoxic chamber, aeration chamber, clarifier chamber, wastewater aeration and recirculation, activated sludge recirculation and aeration, and waste system, and instrumentation as shown on FIGS. 1 & 2.

A wastewater pump and an air aspirator-mixer are used to provide the wastewater aeration and recirculation, and the activated sludge recirculation and aeration, and waste. The wastewater pump can be a submersible pump located in the aeration chamber or a dry pit pump located beside the aeration chamber. The air aspirator-mixer is located either above or beside the aeration chamber. Single or multiple pumps and air aspirator-mixers can be used, depending on the size and capacity of the treatment system.

A wastewater effluent pump is used instead of a non-clog wastewater pump for a better efficiency of the pumping and aeration process.

The patented J.K. air aspirator-mixer (U.S. Pat. No. 6,969, 052 B2) is preferred, but other air aspirators and mixers can be used as well, if adequate air supply and the air and wastewater mixing are provided.

The primary suspended solids and the excess activated sludge retention chamber is sized either to retain the sludge for a longer period of time of several months or weeks, which may be preferred in small treatment systems, such as domestic or institutional systems, or for a much shorter period of time of several hours or days which is preferred in large treatment systems such as municipal or large industrial systems, in which case, the sludge is removed from the chamber continuously or intermittently daily for further treatment or disposal.

The aeration process can be continuous or intermittent depending on the wastewater supply pattern throughout a day or other period of time and the treatment process required.

In the continuous aeration mode, it is preferred to control the air supply flow rate such to develop horizontal stratification zones in the aeration chamber, from the bottom to the top, of a high aeration zone, a moderate aeration zone, a light aeration zone and a mixed anoxic zone, in order to continuously provide BOD removal, ammonia nitrification and denitrification in the aeration chamber.

The wastewater and activated sludge are also recirculated to the anoxic chamber, located between the primary sludge holding chamber and the aeration chamber, in order to provide for phosphorus and nitrogen removal in the anoxic chamber.

In the anoxic chamber, the aerated wastewater and activated sludge are mixed with the fresh unaerated wastewater which quickly depletes the oxygen contained in the aerated wastewater, thus phosphorus and nitrogen removal processes are accomplished.

In the intermittent aeration mode, the wastewater is subjected to aeration and no aeration (anoxic) with mixing periods of approximately 1 hour to 2 hours each period. The wastewater is recirculated to the anoxic chamber during the aeration period or both during the aeration and no-aeration periods. The intermittent aeration mode is preferred during low wastewater flow periods and no flow periods which may appear in small systems or industrial systems operated on shift basis, and low strength wastewater systems.

The use of an air aspirator-mixer ensures a high level of oxygen transfer to the wastewater immediately after the air is aspired into and mixed with the wastewater, and which takes place before the aerated wastewater enters the aeration chamber. The oxygen transfer into the wastewater continues in the aeration chamber but it diminishes from the bottom to the top of the chamber, thus the level of aeration (oxygen transfer) is reduced from the bottom to the top and the horizontal aeration stratification zones are developed in the aeration chamber.

The other advantage is derived from the aeration stratification, that the inlet unaerated wastewater and the activated sludge return from the clarifier chamber are mixed with the aerated wastewater from the aeration chamber and the mixture is further immediately re-aerated and mixed in the air aspirator-mixer and returned to the highly aerated wastewater zone in the aeration chamber.

The aeration and recirculation pump provides the aeration and recirculation of the wastewater, and the activated sludge at a flow rate of up to twelve times higher than the inlet wastewater design flow rate. The activated sludge recirculation flow rate and the aerated wastewater flow rate are several times higher than the inlet wastewater flow rate and up to 70% of the aeration/recirculation pump flow rate. The flow rates are related to the inlet wastewater quality and the required treated effluent quality.

The aerated wastewater flows into the clarifier at a flow rate of up to 100% higher than the inlet wastewater design flow rate. The biomass developed in the aeration process settles at the bottom of the clarifier and is recirculated to the aeration chamber along with a portion of the treated wastewater which entered the clarifier chamber. The portion of the treated and clarified wastewater, equal to the inlet wastewater flow rate, is discharged from the clarifier to a disposal.

The activated sludge is intermittently or continuously wasted into the primary suspended solids and excess activated sludge retention chamber by intermittent or continuous discharges of the recirculated wastewater and activated sludge into the sludge retention chamber.

A portion of the wastewater and activated sludge recirculated by the aeration and recirculation pump is discharged to the upper zone in the aeration chamber, before the wastewater and activated sludge are re-aerated, to provide nutrients for the denitrification process which takes place in the upper part of the aeration chamber.

A suspended solids meter is preferred to monitor the suspended solids (mixed licquir suspended solids) density in the aeration chamber lower, high aeration zone and dissolved oxygen meters are preferred to monitor the dissolved oxygen in the aeration chamber lower, high aeration zone and the upper, low aeration/anoxic zone boundary.

A flow meter is preferred on the inlet wastewater line to monitor the inlet wastewater flow rates and volumes.

The above instrumentation is not mandatory, but it is preferred to facilitate setting up of the system operating parameters for a high efficiency performance, reliability and consistency in applications of varying inlet wastewater flow rates and quality.

BRIEF DESCRIPTION OF THE SEVERAL VIEWS OF THE DRAWING

Having thus generally described the invention, it will be referred to more specifically by reference to the accompanying drawings illustrating preferred embodiments, and in which.

DETAILED DESCRIPTION OF THE INVENTION

Figure 1:
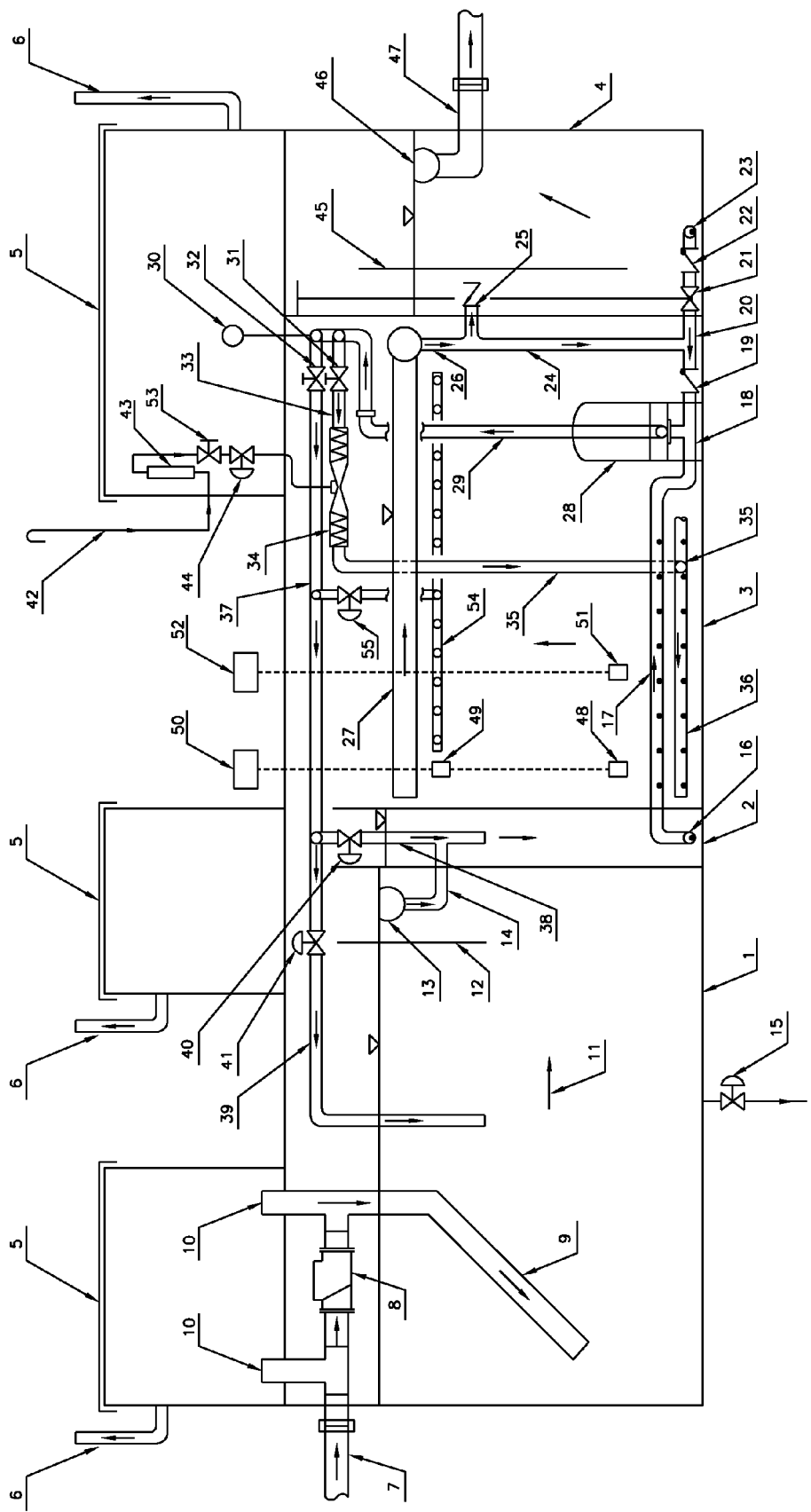
FIG. 1 is a diagrammatic illustration in vertical cross-section of the treatment process and apparatus with the aeration and recirculation pump located inside the aeration chamber.
Figure 2:
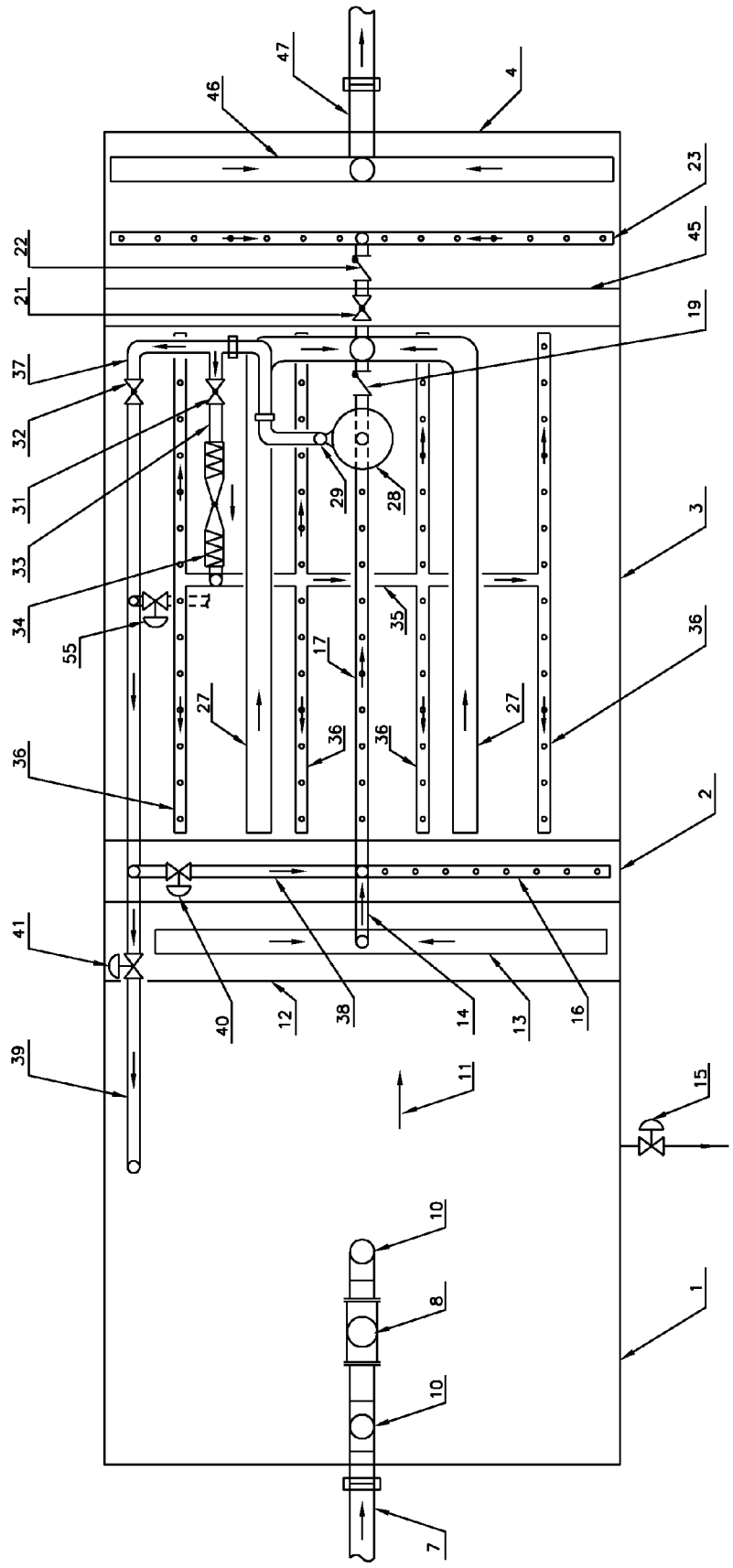
FIG. 2 is a diagrammatic illustration in horizontal cross-section of the treatment process and apparatus with the aeration and recirculation pump located inside the aeration chamber.

According to the embodiment of the invention, as shown on FIGS. 1 & 2, the treatment system comprises the following major components: a primary suspended solids and activated sludge waste retention chamber 1, further referred to as sludge retention chamber, an anoxic chamber 2, an aeration chamber 3, a clarifier chamber 4, access manhole 5, an inlet wastewater pipe 7, an inlet wastewater flow meter 8, an aeration and recirculation pump 28, an air aspirator-mixer 34, and an effluent-wastewater pipe 47.

Inlet wastewater enters the sludge retention chamber 1 through the inlet pipe 7, the flow meter 8 and a discharge pipe 9. The flow meter 8 is vented on the inlet and outlet sides with vent pipes 10. The discharge pipe 9 is preferably directed toward the front end of the sludge retention chamber 1.

The inlet wastewater suspended solids and the activated waste sludge settle in the retention chamber 1 and a clarified wastewater flows toward the anoxic chamber 2, as shown by a flow direction arrow 11.

The settled inlet wastewater flows to an overflow trough 13 and further to the anoxic chamber 2, through a pipe 14 which connects to a wastewater and activated sludge return pipe 38, inside the anoxic chamber 2.

The settled inlet wastewater and the recirculated wastewater and activated sludge mix together in the anoxic chamber 2 and the mixture of the wastewater and the activated sludge flows to the aeration and recirculation pump 28 through a perforated pipe 16 located in the anoxic chamber 2 and a perforated pipe 17 (single or multiple) located in the aeration chamber 3.

The aeration and recirculation pump 28 receives wastewater and activated sludge from the anoxic chamber 2, aerated wastewater from the bottom of the aeration chamber 3 and nitrified and partially denitrified wastewater from the top of the aeration chamber 3, and activated sludge from the clarifier chamber 4.

The mixture of wastewater and activated sludge is pumped into two streams; one, an aeration stream through a pipe 33 and the air aspirator-mixer 34 where it mixes with air and the aerated mixture is discharged into the aeration chamber 3 through solid discharge pipe 35 and bottom perforated pipe 36, and the second, a recirculation stream, through a pipe 37, is not aerated and it is occasionally or continuously discharged to the retention chamber 1 through a control valve 41 and a discharge pipe 39 and to the anoxic chamber 2 through a control valve 40 and a discharge pipe 38, and to the upper part of the clarifier 3 through a control valve 55 and a discharge pipe 54.

Treated wastewater and activated sludge overflow from the aeration chamber 3 into the clarifier chamber 4 through horizontal troughs 27 and discharge pipes 26 & 25. The discharge pipe 25 is provided with a non-return valve to prevent flow of the treated wastewater from the upper part of the clarifier chamber 4 to the aeration and recirculation pump 28.

The treated wastewater and the activated sludge separate in the clarifier chamber 4 and a clarified treated wastewater overflows to an outlet trough 46 and further to the effluent pipe 47, and the activated sludge settles to the bottom of the clarifier chamber 4, and it is returned by the aeration and recirculation pump 28 partially to the aeration chamber 3, anoxic chamber 2 and the sludge retention chamber 1 where the activated sludge is wasted.

The aeration process which take place in the aeration chamber 3 comprise four horizontal aeration zones which from the bottom to the top are: high aeration, moderate aeration, low aeration and anoxic zone.

The BOD removal and the nitrification of ammonia to nitrate take place in the high, moderate and low aeration zones while the denitrification process takes place in the anoxic zone of the aeration chamber 3.

The nitrified and partially denitrified wastewater which is returned to the anoxic chamber 2 with activated sludge and mixed with the inlet wastewater undergoes a phosphorus removal process and further denitrification process.

A suspended solids removal is accomplished in the sludge retention chamber 1 and in the clarifier chamber 4.

The aeration system which comprises the aeration and recirculation pump 28 and the air aspirator-mixer 34 also includes an open/close control valve 44, a rotometer 43 and an air inlet pipe 42. The rotometer 43 measures the air flow rate and the control valve 44 permits to operate the aeration chamber 3 in intermittent modes of aeration and no aeration (anoxic) while maintaining mixing of the wastewater in the aeration chamber 3 by the aeration and recirculation pump 28. This mode of operation is preferred during low flow or no flow of the inlet wastewater periods, and low strength wastewater systems.

Wastewater & activated sludge mixture flow rates into the aeration stream 33 and the recirculation stream 37, can be adjusted by manually operated valves 31 & 32.

The density of the suspended solids in the aeration chamber 3 is monitored by a suspended solids meter 52 and the desired density of the suspended solids in the aeration chamber 3 is maintained by periodical discharges of the mixture of the wastewater and the activated sludge which enter the aeration & recirculation pump 28 into the sludge retention chamber 1, through the control valve 41 and the discharge pipe 39.

Oxygen levels in the aeration chamber are monitored at two levels; at a low level in the high aeration zone and at an upper level at the low aeration and anoxic zones boundary, by oxygen sensors 48 & 49 respectively and an oxygen monitor 50. The oxygen levels in the aeration chamber 3 can be adjusted, to desired levels, by a manually operated air supply rate of flow control valve 53 or by the automatic air supply on/off control valve 44, by an intermittent supply of air to the aeration chamber 3.

The primary suspended solids and the activated sludge waste can be removed from the retention chamber 1 periodically or more frequently either by pumping out the sludge waste or discharging it through a control valve 15 to a designated sludge processing facility or disposal site.

The invention is not limited to the embodiment shown on FIGS. 1 & 2 and as outlined above, and it encompasses all the variations thereof which include installation of the aeration and recirculation pump 28 outside the aeration chamber 3, multiple aeration & recirculation pumps and air aspirator-mixers, separate aeration and recirculation pumps, open chambers without access manholes, underground and above ground chambers, separate chambers connected with pipes or channels, inlet wastewater flow meter located in a separate chamber etc.

The invention claimed is:

1. A wastewater treatment system comprising:
a sludge retention chamber,
an anoxic chamber,
an aeration chamber,
a clarifier chamber,
a wastewater and sludge aeration and recirculation systems,
an instrumentation;
said sludge retention chamber is provided for settling and retention of inlet wastewater suspended solids (primary, suspended solids) and waste (excess) activated sludge which is continuously or intermittently wasted into said sludge retention chamber;
said anoxic chamber is provided for receiving clarified (settled) inlet wastewater from said sludge retention chamber and recirculated wastewater and activated sludge from a wastewater and sludge recirculation, not aerated, stream continuously or intermittently;
said aeration chamber is provided for wastewater treatment aeration process in which four horizontal aeration zones are developed and which are from the bottom to the top; high aeration, moderate aeration, low aeration and anoxic zones;
said clarifier chamber is provided to separate treated wastewater and activated sludge, wherein clarified treated wastewater overflows to an effluent pipe and activated sludge settles to the bottom of said clarifier and is returned by an aeration and recirculation pump partially to said aeration chamber, said anoxic chamber and said sludge retention chamber where the activated sludge is wasted;
said wastewater and sludge aeration and recirculation system comprises a wastewater aeration and recirculation pump and an air aspirator-mixer to provide wastewater and activated sludge aeration and recirculation and the activated sludge waste to said sludge retention chamber;
said instrumentation comprises an inlet wastewater flow meter located on an inlet wastewater pipe, a suspended solids meter and a dissolved oxygen meter located in said aeration chamber, a rotometer and an open/close control valve provided for an aeration system, and control valves located on said recirculation stream discharge pipes to said sludge retention chamber, said anoxic chamber and upper part of said aeration chamber.

2. A wastewater treatment system of claim 1 wherein said sludge retention chamber is fluidly connected with said inlet wastewater pipe and said anoxic chamber which receives clarified (settled) inlet wastewater from said sludge retention chamber, and said sludge retention chamber is sized either to retain the settled sludge (primary suspended solids and waste activated sludge) for a longer period of time of several months or weeks, which may be preferred in small treatment systems, such as domestic or institutional systems, or for a much shorter period of time of several hours or days which is preferred in large treatment systems such as municipal or large industrial systems, in which case, the sludge is removed from the chamber continuously or intermittently daily for further treatment or disposal.

3. A wastewater treatment system of claim 1 wherein said anoxic chamber receives clarified (settled) inlet wastewater from said sludge retention chamber and recirculated wastewater and activated sludge from a wastewater and sludge recirculation stream and which mix together in said anoxic chamber, and the mixture flows to said aeration and recirculation pump through a perforated pipe located in said anoxic chamber and a perforated pipe located in said aeration chamber, which fluidly connects said anoxic chamber, said aeration chamber and said aeration and recirculation pump.

4. A wastewater treatment system of claim 3 wherein said recirculated wastewater and activated sludge and inlet wastewater mix together in said anoxic chamber, and said inlet wastewater depletes the oxygen contained in the recirculated wastewater to accomplish phosphorus and nitrogen removal.

5. A wastewater treatment system of claim 1 wherein said four horizontal aeration zones are developed in said aeration chamber by aeration (oxygen transfer) which diminishes from the bottom to the top of said aeration chamber to form horizontal aeration stratification zones in said aeration chamber, in which BOD removal and nitrification of ammonia to nitrate take place in the high, moderate and low aeration zones and denitrification process takes place in the anoxic zone.

6. A wastewater treatment system of claim 1 wherein said aeration and recirculation pump receives wastewater and activated sludge from said anoxic chamber, aerated wastewater from the bottom of said aeration chamber, nitrified and partially denitrified wastewater from the top of said aeration chamber and activated sludge from said clarifier chamber, and the mixture of wastewater and sludge is pumped into two streams; an aeration stream and a recirculation stream.

7. A wastewater treatment system of claim 6 wherein said aeration stream is pumped through said air aspirator-mixer where wastewater and activated sludge mixes with air and the aerated mixture is discharge do the bottom of said aeration chamber through a perforated pipe.

8. A wastewater treatment system of claim 7 wherein said air aspirator-mixer ensures a high level of oxygen transfer to the wastewater immediately after the air is aspired into and mixed with the wastewater and which takes place before the aerated wastewater enters said aeration chamber, and the oxygen transfer into the wastewater continues in said aeration chamber; but, it diminishes from the bottom to the top of said aeration chamber, thus the level of aeration (oxygen transfer) is reduced from the bottom to the top and horizontal aeration stratification zones develop in said aeration chamber.

9. A wastewater treatment system of claim 7 wherein said horizontal aeration stratification in said aeration chamber allows to mix inlet untreated wastewater and activated sludge return from said clarifier chamber with aerated wastewater from said aeration chamber and immediate re-aeration of the mixture in said air aspirator-mixer and return of the aerated mixture to the highly aerated wastewater zone in said aeration chamber.

10. A wastewater treatment system of claim 6 wherein said recirculation stream is not aerated and it is intermittently or continuously discharged to said sludge retention chamber through a control valve, to said anoxic chamber through a control valve and to said aeration chamber upper part through a control valve.

11. A wastewater treatment system of claim 1 wherein said wastewater and activated sludge aeration can be continuous or intermittent depending on the wastewater supply pattern throughout a day or other period of time and the treatment process required.

12. A wastewater treatment system of claim 11 wherein said continuous aeration prefers a control of air supply flow rate such to develop horizontal stratification zones in said aeration chamber, from the bottom to the top, of a high aeration, a moderate aeration, a light aeration and a mixed anoxic zone, in order to continuously provide BOD removal, ammonia nitrification and denitrification in said aeration chamber.

13. A wastewater treatment system of claim 11 wherein said intermittent aeration is subjected to aeration and no aeration (anoxic) with mixing period of approximately one hour to two hours each period and the wastewater is recirculated to said anoxic chamber during the aeration period or both; the aeration and no aeration periods, and the intermittent aeration is preferred during low wastewater flow periods and no flow periods which may appear in small systems or industrial systems operated on shift basis and low strength wastewater systems.

14. A wastewater treatment system of claim 6 wherein said aeration and recirculation pump can be a submersible pump located in said aeration chamber or a dry pit pump located beside said aeration chamber and be preferably a wastewater effluent pump for a better efficiency of the pumping and aeration process, have flow rate of up to twelve times the inlet wastewater design flow rate and to provide activated sludge recirculation flow rate and the aerated wastewater flow rate several times higher than the inlet wastewater flow rate, and the flow rates are related to the inlet wastewater quality and the required treatment effluent quality.

15. A wastewater treatment system of claim 8 wherein said air aspirator-mixer can be located either above or beside said aeration chamber and single or multiple air aspirator-mixers can be used in conjunction with single or multiple aeration and recirculation pumps depending on the size and capacity of the treatment system.

16. A wastewater treatment system of claim 10 wherein said recirculation stream is intermittently or continuously discharge to said aeration chamber upper part (zone) before the wastewater and activated sludge are re-aerated to provide nutrients for the denitrification process which takes place in the upper part (zone) of said aeration chamber.

17. A wastewater treatment system of claim 1 wherein said wastewater and sludge aeration and recirculation system is fluidly connected with said sludge retention chamber, said anoxic chamber, said aeration chamber and said clarifier chamber, and said wastewater and sludge aeration and recirculation system comprises said aeration and recirculation pump said air aspirator-mixer, said rotameter, said control valves and piping which connects said chambers to said wastewater and sludge aeration and recirculation system.

* * * * *